D. G. ROOS.
HOLDER FOR RIMS AND TIRES.
APPLICATION FILED APR. 2, 1917.

1,407,300.

Patented Feb. 21, 1922.
2 SHEETS—SHEET 1.

Inventor:
Delmar G. Roos.
by Emery Booth Janney & Varney
Attys.

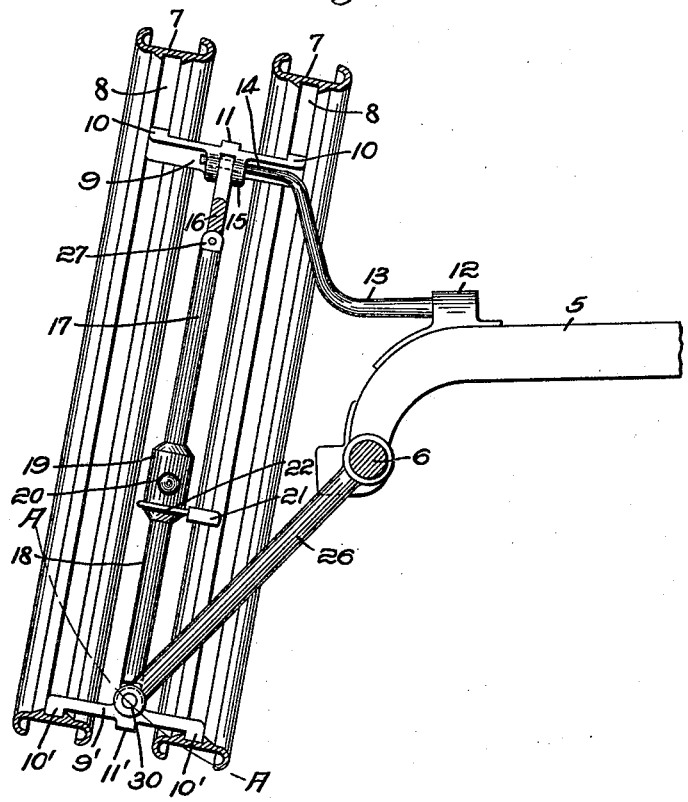

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

HOLDER FOR RIMS AND TIRES.

1,407,300. Specification of Letters Patent. Patented Feb. 21, 1922.

Application filed April 2, 1917. Serial No. 159,086.

*To all whom it may concern:*

Be it known that I, DELMAR G. ROOS, a citizen of the United States, and a resident of Bridgeport, in the county of Fairfield and State of Connecticut, have invented an Improvement in Holders for Rims and Tires, of which the following description, in connection with the accompanying drawings, is a specification, like characters on the drawings representing like parts.

This invention relates to holders for rims and tires of vehicles, and is more especially, though not exclusively concerned with a tire and rim holder or carrier of that class in which the supporting devices engage the internal periphery of the rim or rims.

My invention will be best understood by reference to the following description, when taken in connection with the accompanying drawings of one specific embodiment thereof, while its scope will be more particularly pointed out in the appended claims.

In the drawings:

Fig. 4 is a sectional view, partly in elevation, on line 4—4 of Fig. 1.

Figure 1:
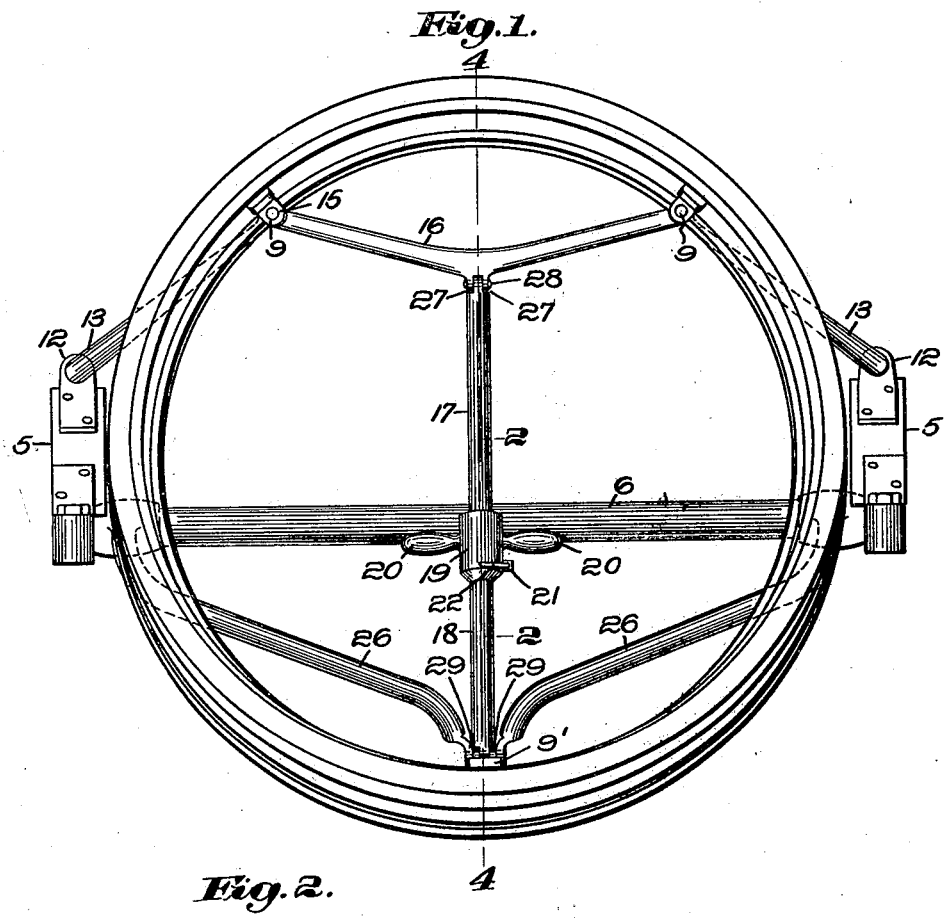
Fig. 1 is a rear elevation of a portion of a motor car frame equipped with a rim and tire holder embodying my invention, and showing two rims in place upon the holder.
Figure 2:
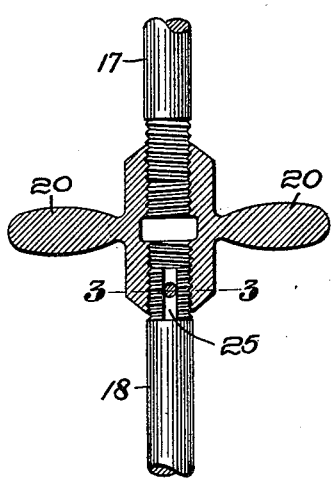
Fig. 2 is a detail section on an enlarged scale on that portion of line 4—4 which is between the numerals 2—2 of Fig. 1.
Figure 3:
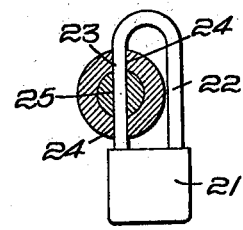
Fig. 3 is a detail sectional view on line 3—3 of Fig. 2.

Referring to the drawings, and to the embodiment of my invention which I have selected for illustration, I have there shown a suitable support, herein a vehicle frame, comprising a pair of side members 5 connected together by a cross member 6, the frame constituting a support for the tire holder proper.

The tire holder as herein shown is intended for use in connection with various common forms of demountable rims, and will support the latter irrespective of whether or not they are equipped with tires. In the present example, I have shown two rims 7 of common and well-known construction, each provided with an internal peripheral groove 8. When a rim of this type is placed on its wheel, this groove is utilized to receive the rim fastening elements carried by the wheel felloe, but when the rim is mounted on a holder, this groove serves as a convenient means to receive a plurality of rim-engaging members of any suitable character, herein a pair of upper shoes 9 and a lower shoe 9', all suitably formed for engagement with the rim or rims. In the present example, each of the shoes 9 is provided with a pair of lugs 10 and an intermediate lug 11. Similarly, the shoe 9' is provided with two lugs 10' and an intermediate lug 11'. When two rims are carried, they are mounted on the lugs 10 and 10' as shown in Fig. 4. When one rim only is carried, it may be mounted on the intermediate lugs 11 and 11', or upon one of the other sets of lugs if desired.

The two upper shoes 9 may be supported upon the vehicle frame by any suitable means, but herein the latter is provided with a pair of brackets 12 having rigid arms 13 provided with offset portions 14, the latter extending into and being rigidly secured to each of a pair of lugs 15, one pair on each of the shoes 9. These lugs are herein spaced apart to receive between them a brace member 16. The latter extends from one to the other of the upper shoes 9, and cooperates with the arms 13 in holding the shoes in definitely fixed position. Thus it is evident that the shoes 9 sustain the weight of the rim or rims, and of the tire or tires.

As a means for moving the lower shoe 9' toward and from and locking the same with reference to the internal peripheral surfaces of the rim or rims, I have herein provided two co-axially disposed members 17 and 18, and a connecting turnbuckle 19, the latter being herein in the form of a sleeve having right-and-left threaded engagement with the adjacent terminal portions of the members 17 and 18, whereby the latter may be caused to approach and recede one from the other. In other words, these parts constitute a telescopically expansible and contractible device interposed between the upper shoes 9 and the lower shoe 9'. As a convenient means for turning the sleeve 19, the latter is herein provided with a pair of handles 20. In order to prevent any unauthorized removal of the rim or rims and tire or tires from the holder, I have herein provided locking means in the form of a padlock 21 having a hasp 22, one leg 23 of which extends through perforations 24 provided in the sleeve 19, and through a slot 25 provided in the terminal portion of the member 18. The character of this locking device is such that a person can see at once whether or not the device is locked, and hence there is no danger of his attempting to turn the sleeve 19 until the lock has been removed. The lock may be applied by simply turning the sleeve until its perforations register with the slot 25, whereupon the leg 23 of the padlock hasp 22 may be inserted and the hasp secured into place in a usual and well-known manner which it is unnecessary here to describe.

As a means for supporting the lower portion of the tire holder while still permitting the latter to be expanded and contracted with relation to the rim or rims, I may provide one or more, herein a pair, of links 26, each of the latter being pivotally connected to the vehicle frame, as well as to the lower shoe 9'. To this end, the latter is herein provided with a pair of ears 29, to which one pair of ends of the links 26 is pivoted. The other pair is herein pivoted to and supported upon the cross member 6 of the frame.

It must now be evident that when the sleeve 19 is turned to cause the shoe 9' to approach or to recede from the rim or rims, the links 26 will have a natural tendency to swing about the axis of the cross member 6, as indicated by the arc A—A. It should here be observed that the member 17 is pivoted to the brace member 16, the latter to this end being herein provided with a pair of ears 27 adapted to receive between them the terminal portion of the member 17, which is pivoted to the ears by a pivotal pin 28. Similarly, the shoe 9' is provided with a pair of ears 29 between which the terminal portion of the member 18 is interposed. A pivotal pin 30 passes through these ears, as well as through the terminal portions of the members 18 and links 26, and serves as a common fulcrum for all of these parts.

Thus it is apparent that the members 17 and 18 and the sleeve 19 constitute a longitudinally expansible and contractible link which is pivoted at its upper end to the brace member 16 and at its lower end to the shoe 9' and links 26. The holder therefore constitutes a flexible supporting structure for the rim or rims, this flexibility possessing two advantages: first, it permits the holder to be expanded and contracted radially, and second, it prevents the parts from cramping and binding and becoming disabled, as they would be very apt to do in the case of holders of known types employing sliding parts requiring great strength and rigidity to keep them from becoming injured and disabled by the road shocks to which the holder is subjected, as well as collisions of the holder with objects at the rear of the car when the latter is backing. This is a frequent cause of difficulty with car holders of known types.

In the use of the described holder, however, the flexibility of the structure prevents injury due to road shocks. It also saves the tire holder from injury in many cases where the rim or rims, tire or tires, or parts of the holder come into contact with objects which would otherwise produce more or less permanent injury to the holder by causing its parts to become bent and cramped so as to interfere with the operation of removing and replacing tires and rims. The use of the brace links 26, moreover, gives a firm support to the lower shoe 9', and transmits directly to the cross member 6 of the frame any shock due to backing against an obstacle.

While I have herein shown and described one specific form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described one specific form of my invention, what I desire by Letters Patent to secure is:

1. In a holder for tires and rims, the combination of a supporting frame comprising a pair of side members and a cross member connecting said side members, a plurality of rim-engaging means, a pair of supporting brackets mounted on said side members, respectively, and supporting two of said rim-engaging means, a brace connecting said two rim-engaging means to each other, a pair of links pivotally connected at one pair of ends to said cross member and at their other pair of ends to the remaining rim-engaging means, two radial members one of which is pivotally connected with said brace and the other of which is pivotally connected with said remaining rim-engaging means, and a turnbuckle connecting said radial members to each other.

2. A holder for tires and rims comprising a bracket support for suspending a rim by engagement with its inner circumference, an opposed rim engaging shoe, an extensible member pivoted to said bracket and shoe respectively to swing transversely thereof and a member pivoted to the vehicle and having a pivotal connection with the shoe to connect the same to the vehicle.

3. A holder for tires and rims comprising a bracket support for suspending a rim by engagement with its inner circumference and cooperating means for clamping the rim comprising a pivotally supported extensible member carrying a shoe pivoted thereon to swing transversely of the plane of the rim and adapted to engage the rim at a point opposite said bracket and a member pivoted to the vehicle and having a pivotal connection with the shoe to connect the same to the vehicle.

4. A holder for tires and rims comprising a set of shoes to engage the inner circumference of the rim, a connecting frame disposed in the common plane of such shoe and expansible to vary the diameter of the circle drawn through the shoes, such frame including a pivotal joint permitting part of the frame to swing transversely with respect to the rest, means for supporting a part of the frame from the vehicle and a pivotal link connection between the relatively swinging portion of the frame and the vehicle.

5. In a holder for ring-like bodies, the combination of a plurality of members adapted for engagement with the body or bodies, an expansible and contractible device interposed between and connected to said members, said device comprising a turnbuckle and two threaded members having right and left screw-threaded engagement therewith, and said lock comprising a member introducible from the exterior to the interior of said turnbuckle interengaging with said turnbuckle and with one of said threaded members, said last-mentioned parts being suitably apertured to receive said member.

In testimony whereof, I have signed my name to this specification.

DELMAR G. ROOS.